United States Patent
Courtiel et al.

(10) Patent No.: US 10,253,719 B2
(45) Date of Patent: Apr. 9, 2019

(54) METHOD FOR STARTING A DIRECT-INJECTION INTERNAL COMBUSTION ENGINE BY ADAPTING THE QUANTITY OF FUEL INJECTED

(71) Applicants: CONTINENTAL AUTOMOTIVE FRANCE, Toulouse (FR);
CONTINENTAL AUTOMOTIVE GMBH, Hannover (DE)

(72) Inventors: Claude Courtiel, Vieillevigne (FR);
Philippe Serrecchia, Villefranche de Lauragais (FR); Renaud Andre, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/527,828

(22) PCT Filed: Nov. 16, 2015

(86) PCT No.: PCT/EP2015/002285
§ 371 (c)(1),
(2) Date: May 18, 2017

(87) PCT Pub. No.: WO2016/078754
PCT Pub. Date: May 26, 2016

(65) Prior Publication Data
US 2017/0350341 A1 Dec. 7, 2017

(30) Foreign Application Priority Data

Nov. 21, 2014 (FR) .................................. 14 61294
Nov. 13, 2015 (FR) .................................. 15 60858

(51) Int. Cl.
*F02D 41/00* (2006.01)
*F02D 41/06* (2006.01)
(Continued)

(52) U.S. Cl.
CPC ....... *F02D 41/3845* (2013.01); *F02D 19/084* (2013.01); *F02D 41/0025* (2013.01);
(Continued)

(58) Field of Classification Search
CPC ............... F02D 41/3845; F02D 41/062; F02D 2041/389; F02D 2200/021; F02D 2200/0602
See application file for complete search history.

(56) References Cited

U.S. PATENT DOCUMENTS

2010/0132668 A1* 6/2010 Borchsenius ....... F02D 41/3845
123/447
2010/0268441 A1 10/2010 Yoshiume
2015/0330960 A1* 11/2015 Christensen ........ F02D 41/3845
73/37

FOREIGN PATENT DOCUMENTS

DE 10 2010 027675 A1 1/2012
DE 10 2011 077404 A1 12/2012
(Continued)

OTHER PUBLICATIONS

International Search Report, dated Feb. 12, 2016, from corresponding PCT application.

*Primary Examiner* — Hieu T Vo
*Assistant Examiner* — Arnold Castro
(74) *Attorney, Agent, or Firm* — Young & Thompson

(57) ABSTRACT

A method for starting a direct-injection internal combustion engine of a vehicle includes: rotating the high-pressure injection pump by a starter; measuring fuel pressure delivered by the pump, taken at two successive compression top dead centers of the pump operating in maximum output mode; establishing the pressure gradient of the fuel, on an
(Continued)

angular reference system, based on the two successive pressure measurements; comparing the established gradient with a predefined bijective table that respectively matches a plurality of quantities of fuel to be injected and a plurality of pressure gradients; and adapting the quantity of fuel injected during the starting phase before the engine reaches steady operating speed, depending on the result of the comparison, in order to inject a quantity of fuel that corresponds, in the predefined bijective table, to the established pressure gradient, upon authorization of the first injection given by the engine control unit.

20 Claims, 7 Drawing Sheets

(51) Int. Cl.
  *F02D 19/08* (2006.01)
  *F02D 41/38* (2006.01)
(52) U.S. Cl.
  CPC ...... *F02D 41/062* (2013.01); *F02D 2041/389* (2013.01); *F02D 2200/021* (2013.01); *F02D 2200/0602* (2013.01); *F02D 2200/0612* (2013.01); *Y02T 10/36* (2013.01)

(56) References Cited

FOREIGN PATENT DOCUMENTS

| | | |
|---|---|---|
| EP | 1 975 398 A2 | 10/2008 |
| JP | 2010255478 A | 11/2010 |

\* cited by examiner

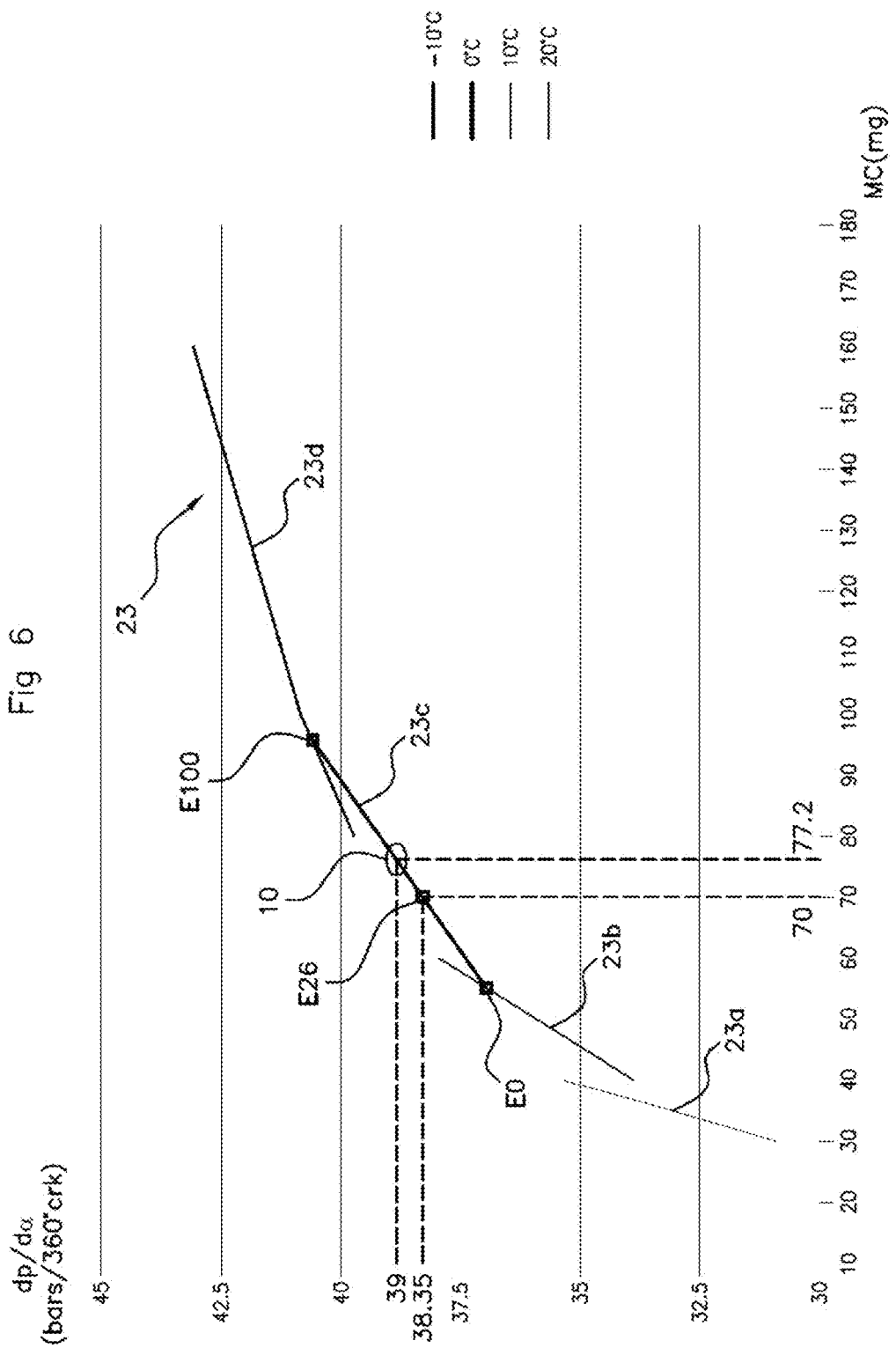

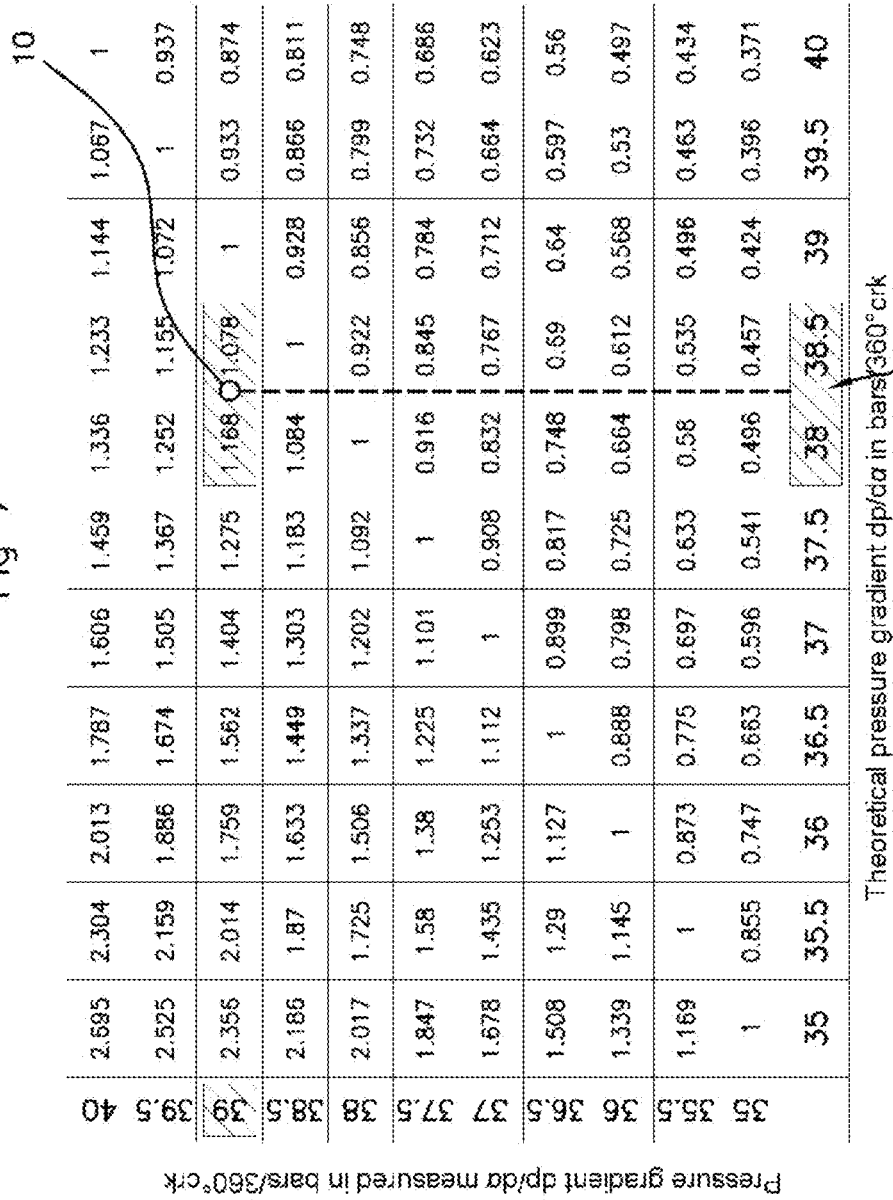

METHOD FOR STARTING A DIRECT-INJECTION INTERNAL COMBUSTION ENGINE BY ADAPTING THE QUANTITY OF FUEL INJECTED

BACKGROUND OF THE INVENTION

The present invention relates to a method for starting a direct-injection internal combustion engine of a vehicle, making it possible to accelerate the starting phase by adapting the quantity of fuel injected during said starting phase, before the engine reaches it steady operating speed, by means of an injection system containing a high-pressure fuel injection pump.

The quantity of fuel to be injected during the starting phase of such an engine is dependent on the temperature of the engine, on the number of top dead centers passed by the crankshaft before the engine reaches it steady operating speed, on the speed of the engine during said starting phase, and likewise on the quality and on the type of fuel used, present in the gasoline tank, which may have been identified or noted in the course of driving the vehicle on a previous occasion.

During starting following filling of the fuel tank with a fuel, of which the characterizing features have changed in relation to the fuel contained before said filling, the lack of accuracy in the quantity of fuel to be injected during starting may give rise to longer starting times or even failures to start.

Document DE102011077404, which proposes a method for identifying the type of fuel before starting the engine, in order to adapt the dosage of the injected quantities of fuel accordingly ahead of the injection, is already familiar. A suchlike method offers the advantage of optimizing the performance of the engine and preventing the injection of an inappropriate fuel into the engine as the result of a fueling error, for example. The method according to this document consists of comparing the curve for the build-up in pressure in the rail as a function of time (dP/dt) with the curves recorded in the ECU ("Engine Control Unit" in English), and thus determining the type or the quality of fuel present in the rail ahead of the injection. The method uses the determination of the Young modulus of the fuel. The quantity of fuel injected may thus be adjusted depending on the type or on the quality of fuel detected. An advantage of said method is that it permits the determination of the type of fuel before combustion, and thus improves the combustion efficiency.

SUMMARY OF THE INVENTION

The present invention proposes to increase the speed of starting of a direct-injection internal combustion engine, irrespective of the fuel present in the fuel tank.

More precisely, the invention consists of a method for starting a direct-injection internal combustion engine of a vehicle, making it possible to accelerate the starting phase by adapting the quantity of fuel injected during said starting phase, before the engine reaches it steady operating speed, by means of an injection system containing a high-pressure fuel injection pump, means of measuring the pressure delivered by the latter, and an engine control unit or ECU, characterized in that said method comprises the following steps:

Rotating the high-pressure injection pump by means of a starter,

Measuring the pressure of the fuel delivered by said high-pressure injection pump, taken at least at two successive compression top dead centers of the pump operating in maximum output mode, Establishing the pressure gradient, on an angular reference system, of the fuel delivered by said high-pressure injection pump, based on the pressure measured at said at least two successive compression top dead centers of the high-pressure injection pump characterized by their angular positions, Comparing said established gradient with at least one predefined bijective table that respectively matches a plurality of quantities of fuel to be injected and a plurality of said pressure gradients, said at least one table being implemented in the engine control unit, Adapting the quantity of fuel injected during the starting phase before the engine reaches it steady operating speed, depending on the result of the comparison, in order to inject a quantity of fuel that corresponds, in the predefined bijective table, to the established pressure gradient, upon authorization of the first injection given by the engine control unit.

The invention involves recording a specific gradient for the increase in pressure of the fuel delivered by the high-pressure pump, based on the compression top dead centers of the pump operating in maximum output mode, in order to optimize as rapidly as possible the accuracy of said specific gradient and the result obtained for the correct quantity of fuel to be injected during the starting phase, by injection. According to the invention, the pressure gradient is established in relation to an angular reference position (compression top dead centers of the pump characterized by their angular positions), making it possible advantageously to disregard the speed of rotation of the starter, which may vary more particularly with the temperature and the battery voltage. Directly on the basis of the gradient for the increase in pressure, the predefined bijective table provides the correct quantity of fuel to be injected, for example for a given range of temperatures. The quantity of fuel to be injected may thus be adjusted with great accuracy before or after the first combustions during the starting phase depending on the type of fuel present in the injection system. Authorization for the first injection is given by the engine control unit, for example as soon as the synchronization of the engine has taken place and as soon as the minimum injection pressure has been reached. The means of measuring the pressure are provided, for example, in a manner known per se by a sensor for the pressure present in an injection system, for example in an accumulator of the high-pressure rail type.

According to one advantageous characterizing feature:
said at least one bijective table that respectively matches a plurality of quantities of fuel to be injected and a plurality of pressure gradients is predefined pour a given range of engine temperatures,
a plurality of said predefined bijective tables are implemented in the engine control unit, covering a plurality of ranges of engine temperatures, respectively, including at least one range of cold-starting temperatures,
said method in addition consisting of measuring the engine temperature before comparing said established gradient with said at least one predefined bijective table.

The expression "predefined bijective table for a given range of engine temperatures" is intended here to denote a given range of temperatures for which the bijective table is applicable. Said given range of temperatures may be reduced to a single temperature for which the bijective table has been defined, if it is wished to restrict the values of said bijective table to said single temperature. Such a choice will depend on the degree of accuracy that it is wished to achieve for the quantities of fuel to be injected depending on the temperatures. In this way, if the bijective table is valid for a given range of temperatures extending around said single temperature value for which it has been defined, having regard for the accuracy to be achieved, the application of said table may be extended to include said range of engine temperatures.

According to one advantageous characterizing feature, the position of said at least two successive compression top dead centers of the fuel injection pump is defined by means of a sensor for the position of the engine crankshaft, by a rule linking the angular positions between the crankshaft and the high-pressure fuel injection pump, and by the engine control unit.

According to one advantageous characterizing feature, the pressure gradient is established in relation to a variation in the angular position of the high-pressure injection pump, in the form $dp/d\alpha$, where:

dp is the variation in pressure between said at least two successive compression top dead centers of the pump, $d\alpha$ is the angular variation of the crankshaft between said at least two successive compression top dead centers of the pump.

Said characterizing feature illustrates more particularly the fact of being able advantageously to disregard the speed of rotation of the starter in the calculation of the pressure gradient.

According to one advantageous characterizing feature, the pressure gradient of the fuel delivered by said high-pressure injection pump is established with three compression top dead centers of the high-pressure injection pump, or more.

The invention relates in addition to a device for starting a direct-injection internal combustion engine, making it possible to accelerate the starting phase by adapting the quantity of fuel injected during said starting phase before the engine reaches it steady operating speed, by an injection system containing a high-pressure fuel injection pump, means of measuring the pressure delivered by the latter, an engine control unit, a starter, means of authorization of the first injection given by the engine control unit, characterized in that it comprises means for the implementation of a method according to the invention.

BRIEF DESCRIPTION OF THE DRAWINGS

Other characterizing features will emerge from a perusal of the following description of examples of embodiments of a method according to the invention, accompanied by the attached drawings, which examples are given for illustrative and non-restrictive purposes, in which:

FIG. 6 represents a graph showing the pressure gradient depending on the quantity of fuel which must be injected by injection during the first injection into each of the cylinders during the starting phase, corresponding to a plurality of given temperatures;

FIG. 7 represents, in the form of a table of correction coefficients obtained from FIG. 6, a coefficient for the correction of the quantity of fuel to be applied to starting at a temperature measured according to a point of measurement of the pressure gradient obtained from the graph in FIGS. 4 to 6.

DETAILED DESCRIPTION OF THE PREFERRED EMBODIMENTS

Figure 1:
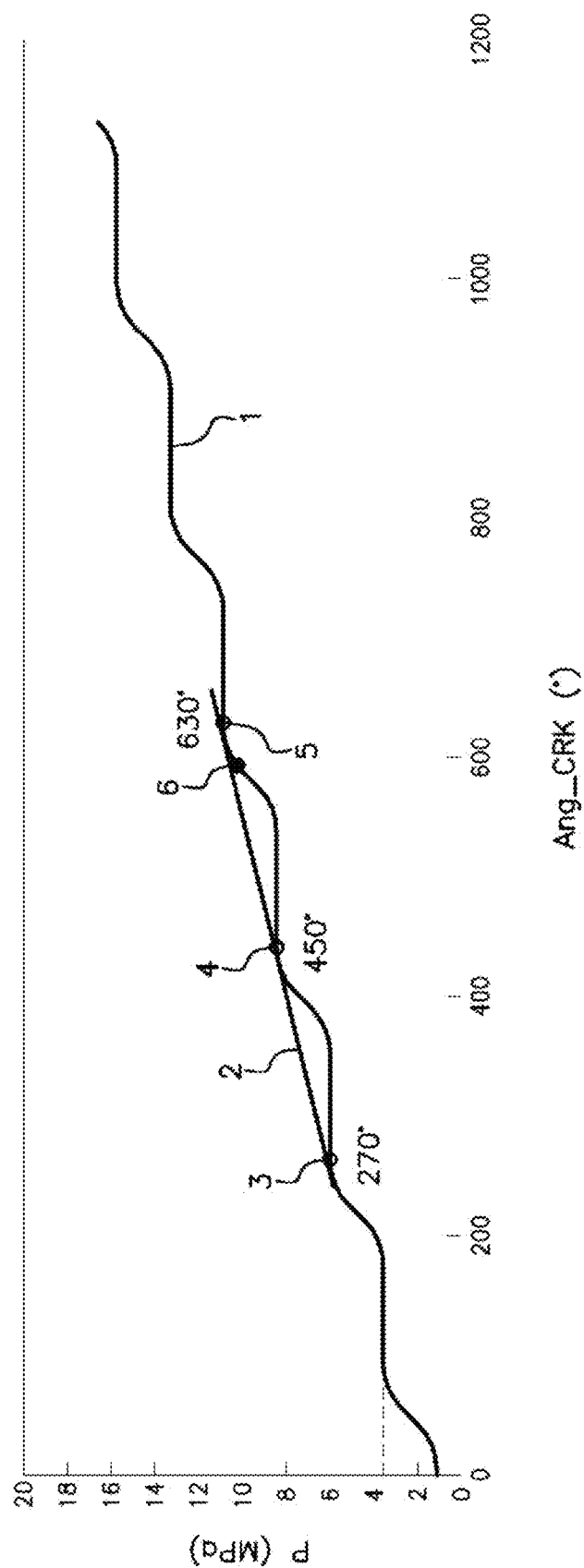
FIG. 1 represents a graph of the pressure of the fuel during the starting phase according to a first example of a method according to the invention for starting an internal combustion engine operating with a fuel of the gasoline type, at a temperature of −30 C.

FIG. 1 represents in a schematic manner a method for starting a direct-injection internal combustion engine of a vehicle, making it possible to accelerate the starting phase by adapting the quantity of fuel injected during said starting phase, before the engine reaches it steady operating speed, by means of an injection system (not represented) containing a high-pressure fuel injection pump, means of measuring the pressure delivered by the latter, for example a fuel pressure sensor positioned in a high-pressure rail for supplying the injectors with fuel, an engine control unit ensuring the management of the injection.

In FIG. 1, the y-axis represents the angular position of the crankshaft Ang_CRK of the engine in degrees, and the x-axis represents the pressure P in MPa of the fuel at the outlet from the high-pressure fuel injection pump measured by the fuel pressure sensor. The represented starting is a cold start. The fuel used is gasoline without a basic mixture, for example E0 fuel (0% of ethanol), and the engine temperature for the starting phase is −30 C, which is also the temperature of the fuel.

The high-pressure injection pump used (not represented) is a conventional pump, in which the admission of fuel is controlled by a valve operated by the engine control unit, and which displaces the fuel under pressure into an accumulator rail (not represented). The maximum output mode corresponds to the compression of the totality of the volume of fuel admitted into the one or more chambers of the pump, said maximum volume of fuel admitted and compressed being constant for the successive compression top dead centers for the measurement of the pressure. The engine control unit decides the mode of operation at maximum output of the pump, by controlling the inlet valve of the pump, which permits the triggering of the process of measuring the pressure. The engine control unit, or ECU, or engine computer, controls the pump in the maximum output mode by closing the fuel inlet valve into the pump as soon as the compression of the fuel starts, thereby preventing any displacement of a part of the volume of the compressed fuel towards the tank. According to the method, verification is made with the engine computer, at the time of sampling the pressure points, that the mode of operation of the pump is in fact a mode of operation at maximum output. The method according to the invention is influenced by the decisions by the engine computer whether or not to operate in maximum output mode. In fact, the ECU manages the control (PID) of the pressure in the accumulator rail. When the pressure in the accumulator rail is far below its set point, the PID regulator decides to operate at maximum output in order to return to the set point as rapidly as possible. During the starting phase, in particular from cold, the pressure in the accumulator rail is far below its set point, necessitating a mode of operation of the pump at maximum output.

The starter (not represented) is capable of causing the engine to rotate at a speed of about 200 revolutions per minute during the starting phase. The curve 1 shows the change in the pressure during the starting phase. Said change shows an increase in the pressure as soon as the pump is caused to rotate.

In FIG. 1, the pump is operating in maximum output mode. The sections of the pressure curve 1 with a strong pressure gradient represent the compression of a volume of fuel admitted into the pump, which is at its maximum at the value achieved in the variation in pressure depending on the rotation of the crankshaft. The starting point of the flat sections corresponds to the top dead centers of the pump, that is to say to the end of the compressions, which themselves determine the starting point of the corresponding phases of admission of the fuel into the pump. The flat sections of the curve 1 represent the admission of the fuel into the pump.

The curve 2 in FIG. 1 links three top dead centers of the pump considered in its mode of operation at maximum output. Said top dead centers are situated substantially at the top of the slopes with a high pressure gradient in FIG. 1, which represent the successive compression of three identical volumes of fuel each corresponding to the maximum volume of fuel admitted and compressed in a chamber of the pump.

The method represented in FIG. 1 comprises the following steps:
   The high-pressure injection pump is caused to rotate by means of a starter, the 0° position on the y-axis representing the position of the crankshaft at the moment when the starter is engaged,
   The pressure of the fuel delivered by the high-pressure injection pump is measured, at the same time verifying from the information coming from the ECU that it is operating in maximum output mode, as mentioned above, at least at two successive compression top dead centers (or TDC for "Top Dead Center" in English) of the pump; said operation can be performed as soon as possible after the crankshaft is caused to rotate by the starter, and preferably before the synchronization of the engine,
   The pressure gradient of the fuel delivered by the high-pressure injection pump in its maximum output mode, based on the pressure measured at least at the two successive compression top dead centers (TDC), for example three TDCs as represented in FIG. 1, of the high-pressure injection pump, is established, preferably before the synchronization of the engine,
   The established gradient is compared with at least one predefined bijective table that respectively matches a plurality of quantities of fuel to be injected and a plurality of said pressure gradients, said at least one table being implemented in the engine control unit, preferably before the synchronization of the engine, The quantity of fuel injected during the starting phase before the engine reaches it steady operating speed, is adapted and, if necessary, modified, for each injection performed, depending on the result of the comparison, in order to inject a quantity of fuel that corresponds, in the predefined bijective table, to the established pressure gradient, upon authorization of the first injection given by the engine control unit, which generally takes place after the synchronization of the engine has been realized, or from the first engine cycle following the synchronization.

The synchronization is realized by any means familiar to a person skilled in the art, by means of the engine control unit and the signal that is sent to it by a crankshaft position sensor, and this will accordingly not be described here in any more detail.

According to the example represented in FIG. 1, the pressure of the fuel is measured at the first 3 compression top dead center of the pump at 270° from the position in which the crankshaft is caused to rotate, in order to ensure that the pump is in fact operating at its speed of maximum output, and then at the second 4 compression top dead center of the pump at 450° from the position in which the crankshaft is caused to rotate, and then preferably in addition at the third 5 compression top dead center of the pump at 630° from the position in which the crankshaft is caused to rotate, as represented in FIG. 1.

Said positions are defined advantageously by means of the crankshaft position sensor, and by a rule linking the angular positions between the crankshaft and the high-pressure fuel injection pump, and by the engine control unit (ECU) which applies said rule. The rule is given by the transmission ratio between the rotation of the crankshaft and the mechanically linked rotation of the injection pump, which establishes the position of the compression top dead centers of the pump depending on the angular positions of the crankshaft.

The pressure gradient is thus preferably established in relation to a variation in the angular position of the high-pressure injection pump, in the form $dp/d\alpha$, where:
   $dp$ is the variation in pressure between the three successive compression top dead centers or TDC of the pump,
   $d\alpha$ is the angular variation of the crankshaft between said three successive compression top dead centers or TDC of the pump.

The use of the compression top dead centers makes it possible to use an angular reference position with which one is able advantageously to disregard the speed of rotation of the starter, which may vary with the temperature and the battery voltage, and in this way to offer a reliability of the pressure gradient in the sense that it is always recorded in the same configuration of the pump; accordingly, the correlation table is able to correlate quantities of fuel to be injected more accurately.

In the example in FIG. 1, the following values have thus been recorded, as indicated in table I below:

| Fuel gasoline | Angular position of the crankshaft | Recorded pressure | Engine temperature |
| --- | --- | --- | --- |
| 1st TDC | 270° | 6.198 MPa | −30° C. |
| 2nd TDC | 450° | 8.565 MPa | −30 C. |
| 3rd TDC | 630° | 10.68 MPa | −30° C. |

That is to say a pressure gradient of 4.482 MPa for an angular displacement of the crankshaft of 360°.

In the example represented in FIG. 1, the injection pressure is reached at point 6 at an angular position of the crankshaft of about 595°, for a value of 10 MPa. Under these conditions, the choice of the number of reference points for the pressure should advantageously be two points 3 and 4 for the calculation of the pressure gradient. With this choice, an adjustment in the quantity of fuel may be made before having reached the injection pressure, albeit before the first combustions.

Figure 4:
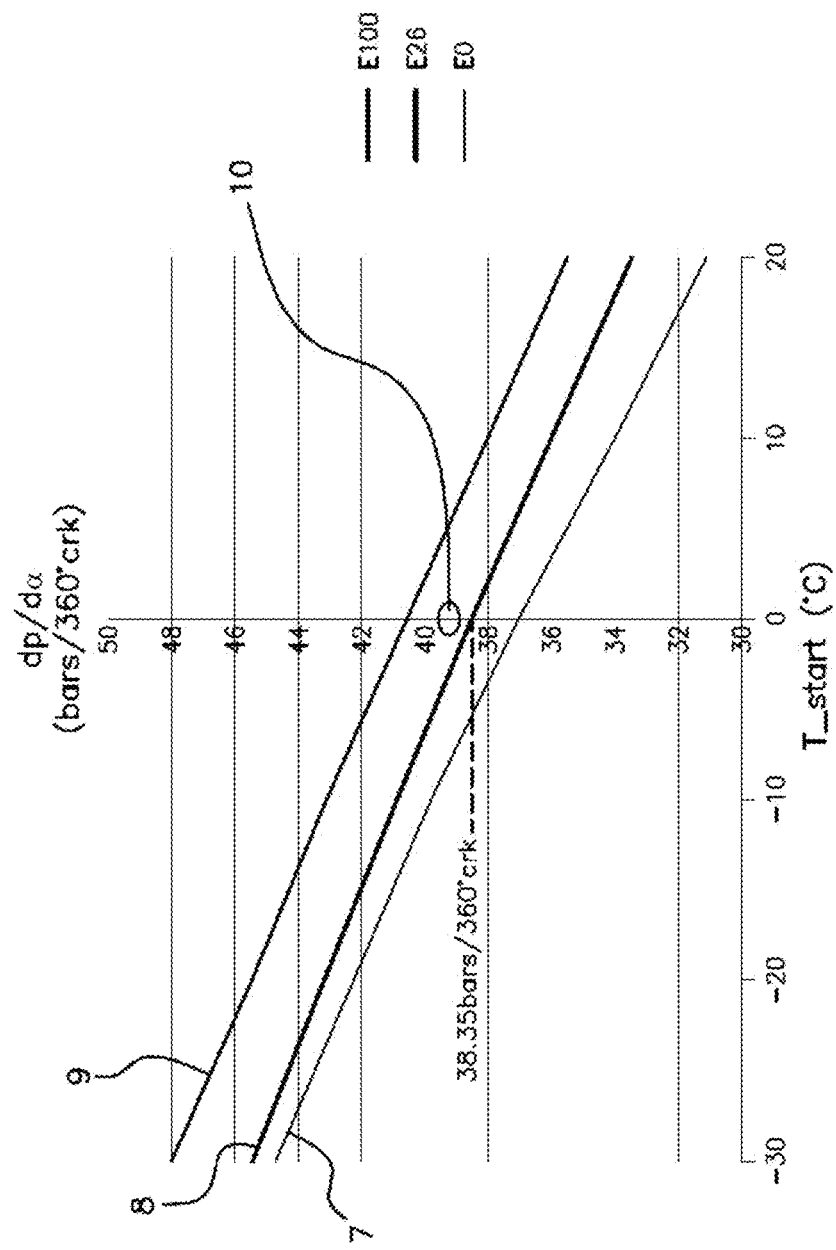
FIG. 4 represents by way of example a graph showing the pressure gradient defined in relation to an angular reference position of the crankshaft, depending on the starting temperature for a given configuration, for three examples of different fuels.

In FIG. 4, the starting temperature T_start of the engine in degrees is represented as the y-axis, and the pressure gradient $dp/d\alpha$ as described above in bars per 360° of rotation of the crankshaft is represented as the x-axis. The curves 7, 8, and 9 represent for three fuels, for example an E0 fuel, an E26 fuel, and an E100 fuel respectively, the change in said pressure gradient depending on the starting temperature, in the high-pressure rail for supplying the injectors with fuel when the high-pressure pump is operating in maximum output mode. It should be noted that the E0 fuel is gasoline without ethanol, E26 is gasoline with a level of ethanol of 26%, and E100 is ethanol without gasoline. The entirety of the possible fuels from E0 fuel to E100 fuel, as detailed below, will thus be covered. It should be noted that the fuel present in the fuel tank may be a mixture of a plurality of different fuels, of which the level of ethanol may be unknown at the moment of starting and may thus be comprised between 0% and 100%. In a manner familiar per se, the ECU knows the fuel present in the vehicle before stopping the engine, more particularly by means of strategies implemented in said ECU.

On the basis of a pre-established graph, such as that in FIG. 4, which may include a greater number of curves representing a greater number of different fuels, at least one predefined bijective table is realized that respectively matches a plurality of quantities of fuel to be injected and a plurality of pressure gradients.

Preferably:
The bijective table that respectively matches a plurality of quantities of fuel to be injected and a plurality of pressure gradients is predefined for a given range of engine temperatures,
A plurality of predefined bijective tables is implemented in the engine control unit, covering a plurality of ranges of engine temperatures, respectively, including at least one range of cold-starting temperatures,
The method involving in addition measuring the engine temperature before comparing the established gradient with the one or more predefined bijective tables.

Represented by way of example in FIG. 4 is a point 10 of measurement of the pressure gradient obtained by a method as described above, for a starting temperature equal to 0° C. In FIG. 4, this point of measurement of the pressure gradient $dp/d\alpha$ is equal to 39 bars per 360° of rotation of the crankshaft (360° crk in FIG. 4). Let us assume, for example, that the previous fuel known by the ECU is E26 fuel. The engine control unit thus expects a theoretical pressure gradient $dp/d\alpha$ equal to 38.35 bars at 0° C. for the E26 fuel, as represented in FIG. 4, said data having been implemented previously in the ECU. The bijective table will permit the ECU to determine the quantity of fuel MC to be injected for a measured pressure gradient $dp/d\alpha$ equal to 39 bars per 360° of rotation of the crankshaft.

The development of an example of a predefined bijective table is detailed below with the aid of FIGS. 5 and 6. A suchlike predefined bijective table is known by the ECU.

Figure 5:
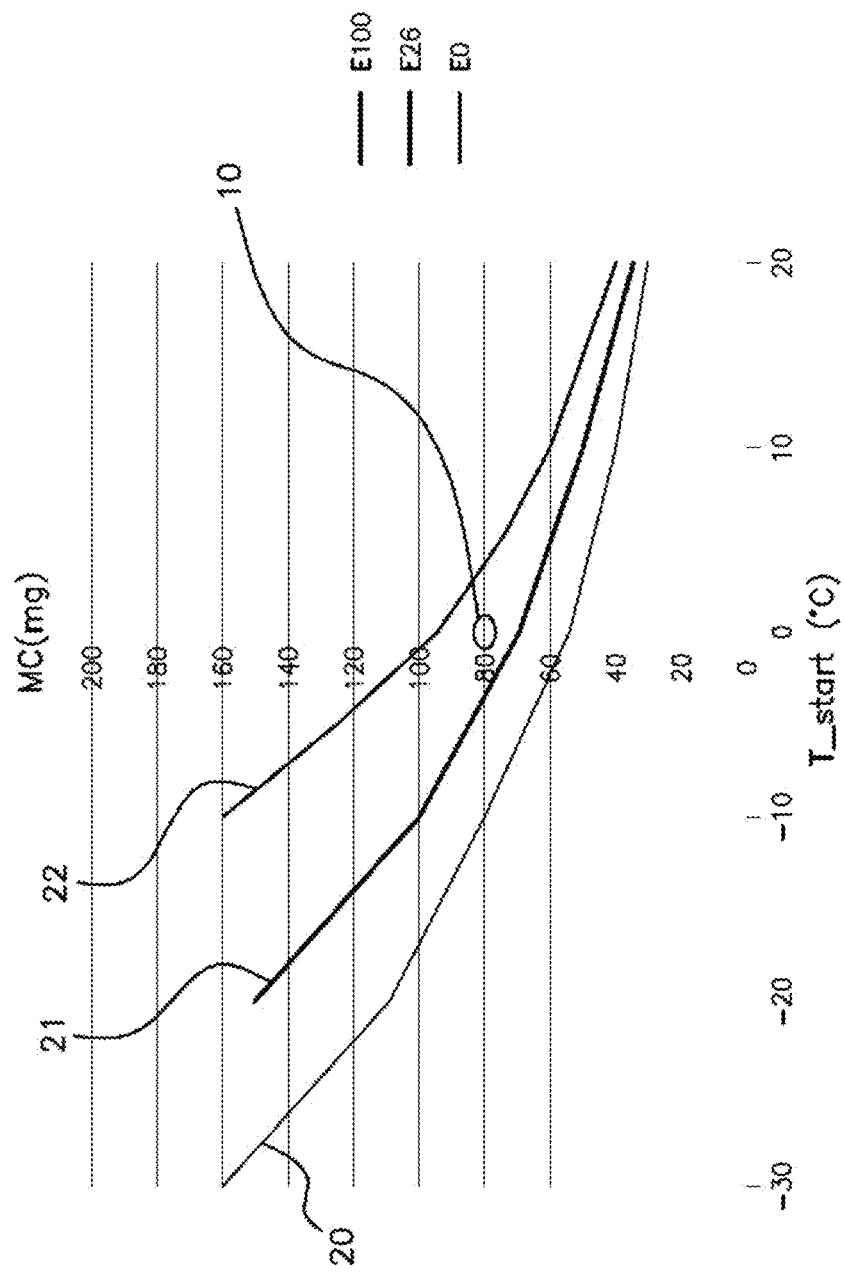
FIG. 5 represents a graph showing, for the three fuels in FIG. 4, the quantity of fuel to be injected during the first injection into each of the cylinders during the starting phase depending on the starting temperature of the engine.

In FIG. 5, the starting temperature T_start of the engine in degrees is represented as the y-axis, and the quantity of fuel MC in mg which must be injected by injection from the first injection into each of the cylinders during the starting phase, that is to say until the engine reaches it steady operating speed, is represented as the x-axis. The curves 20, 21, and 22 represent, for the three different fuels in FIG. 4, an E0 fuel, an E26 fuel, and an E100 fuel respectively, said quantity of fuel MC to be injected depending on the engine temperature. The quantity of fuel MC to be injected for any fuel between the E0 fuel and the E100 fuel, depending on the starting temperature T_start, is thus determined with FIG. 5.

According to FIG. 5, the ECU is thus getting ready to inject in a conventional manner a quantity of fuel equal to 70 mg of fuel during the first injection of each of the cylinders, depending on the value of 70 mg read on the x-axis for the E26 fuel known by the ECU before stopping the engine. Said quantity of fuel does not correspond to that of the gradient measured for the point 10 as represented, which should be higher. It should be noted that the point 10 has been represented in FIG. 5 solely for information, not being known before the application in FIG. 6.

In FIG. 6, the quantity of fuel MC in mg which must be injected by injection during the first injection into each of the cylinders during the starting phase, that is to say until the engine reaches its steady operating speed, is represented as the y-axis, and the pressure gradient $dp/d\alpha$ in bars per 360° of rotation of the crankshaft is represented as the x-axis, applicable to the theoretical or measured pressure gradient. FIG. 6 illustrates a curve 23 containing a plurality of segments 23a, 23b, 23c, 23d causing a plurality of quantities of fuel MC and a plurality of pressure gradients $dp/d\alpha$ to correspond for different engine temperatures, as indicated in FIG. 6, that is to say a segment of the curve 23 corresponds to a given temperature or a given range of temperatures. A predefined bijective table that respectively matches a plurality of quantities of fuel to be injected and a plurality of said pressure gradients $dp/d\alpha$ is produced from the curve 23. A suchlike bijective table is directly implemented in the ECU, since the latter is unable to use FIG. 6 directly.

In FIG. 6, the curve 23 is therefore composed of a plurality of assembled distinct sections 23a, 23b, 23c, 23d, in the example each being linear and corresponding to a given temperature, that is to say the curve 23a corresponding to an engine temperature of 20° C., the curve 23b corresponding to an engine temperature of 10 C, the curve 23c corresponding to an engine temperature of 0 C, and the curve 23d corresponding to an engine temperature of −10 C. For the realization of an example of a bijective table, a plurality of values are determined preferably evenly distributed on the y-axis, and the corresponding plurality of values are selected on the x-axis, in this way defining a predefined bijective table that respectively matches a plurality of quantities of fuel to be injected and a plurality of said pressure gradients, for a given range of engine temperatures, being in the example −10 C, 0 C, 10° C., 20 C.

The curve 23 covers the entirety of fuels E0 to E100, since it is obtained from FIGS. 4 and 5 as follows: in order to obtain the segment 23a corresponding to a temperature of 20 C, a vertical line in FIG. 4 is plotted at 20° C. on the y-axis, and the values for $dp/d\alpha$ are recorded on the x-axis for each of the represented fuels E0, E26, and E100. In FIG. 5, a vertical line is likewise plotted at 20° C. on the y-axis, and the values for the quantity of fuel MC are recorded on the x-axis for each of the same represented fuels E0, E26, and E100. The three points obtained for the temperature of 20 C illustrated by the segment 23a are then plotted in FIG. 6. The operation is similar for the selected temperatures of 10° C., 0 C, and −10 C permitting the segments 23b, 23c, and 23d respectively to be obtained.

It is possible to realize a bijective table per given temperature, or per given range of temperatures, as explained above, that is to say, for example, four bijective tables per given temperature corresponding respectively to segments 23a, 23b, 23c, 23d. In an alternative manner, it is possible to realize a single bijective table on the basis of FIG. 6 including the four segments 23a, 23b, 23c, 23d. By definition, it may be stated that a given segment in FIG. 6, for example segment 23a, 23b, 23c, or 23d, is valid for a given range of temperatures extending around the single reference value, respectively around 20 C, 10° C., 0° C., or −10° C. It should be noted that, for certain values for the gradient dp/dα, for example 35 bars/360 crk, two values for quantities of fuel are possible, although they correspond to two different temperatures. It would thus be possible by interpolation to exploit a plurality of values of the quantity of fuel MC for a given gradient, corresponding to a plurality of temperatures between two temperatures represented by segments in FIG. 6. In the bijective table, a single quantity of fuel must correspond to a given gradient for a temperature or a given range of temperatures. The choice of ranges for each of the segments 23a, 23b, 23c, 23d forming the curve 23 in FIG. 6 has been defined in order to illustrate a real situation of the values effectively encountered in the field for each of the represented temperatures.

The measured point 10 for the pressure gradient dp/dα has been plotted in FIG. 6. As we are already aware from FIG. 4, said point 10 is not situated on any curve for a fuel known by the ECU. The curve 23 permits the ECU to determine the correct quantity of fuel MC to be injected for the measured value of the gradient dp/dα. According to said measured point 10, for a pressure gradient of 39 bars per rotation of the crankshaft of 360°, at a temperature of 0 C, the quantity of fuel to be injected during the first injection of each of the cylinders should be 77.2 mg. Whereas, for the E26 fuel that is known before stopping the engine, the theoretical pressure gradient dp/dα is equal to 38.35 bars at 0 C (see FIG. 4) and corresponds to a quantity of fuel MC equal to 70 mg. The correct quantity of fuel MC which should be injected thus exhibits a theoretical increase of 11.03% in relation to the quantity of 70 mg initially proposed by the ECU for the E26 fuel.

Since the ECU is not able to exploit the curves in FIG. 6 directly, it will preferably need to undertake a numerical extrapolation in order to determine the correct quantity of fuel to be injected, on the basis of the bijective table, for example as explained below with the aid of FIG. 7.

FIG. 7 represents an example of a table of correction factors for the quantity of fuel to be injected, depending on the measured gradient dp/dα and in relation to the theoretical gradient dp/dα as defined above. The table in FIG. 7 corresponds to a numerical use of FIG. 6 by the ECU, for a range of gradients dp/dα between 35 and 40 bars/360° crk given by way of example, which are relevant to the anticipated measurements of the pressure gradients dp/dα and are defined by the method according to the invention. The limit values of dp/dα in the table in FIG. 7 are dependent on the limits that are set for the temperature and the dimensions of the high-pressure injection pump and of the high-pressure rail (volume of the rail and displacement of the pump). The gradient dp/dα measured by the method according to the invention is read on the vertical axis of the table, and the theoretical reference gradient dp/dα is read on the horizontal axis of the table, which gives the point 10 in the described example, which has been positioned on the table in FIG. 7. The point 10 corresponds to a value between two columns of the table, but corresponds to a value directly on a line of the table: a simple interpolation can thus be performed by the ECU in order to obtain the correction coefficient to be applied in the example.

According to the measured example for point 10, the correction to be applied by the ECU to the quantity of fuel proposed for the injection as explained above, that is to say 70 mg, is thus in the order of 11% (theoretically 11.03%), in order to obtain a quantity of 77.2 mg corresponding to the measured gradient of 39 bars/360° crk. In accordance with the table in FIG. 7, a linear interpolation on the basis of the data gives a correction factor to be applied to the quantity of fuel equal to 1.110 in relation to the quantity of fuel established on the basis of the theoretical pressure gradient of 38.35 bars per 360° of rotation of the crankshaft for the E26 fuel. Said correction is calculated on one occasion before the first injection and is then applied for the duration of the starting phase until the idling speed is reached.

Figure 2:
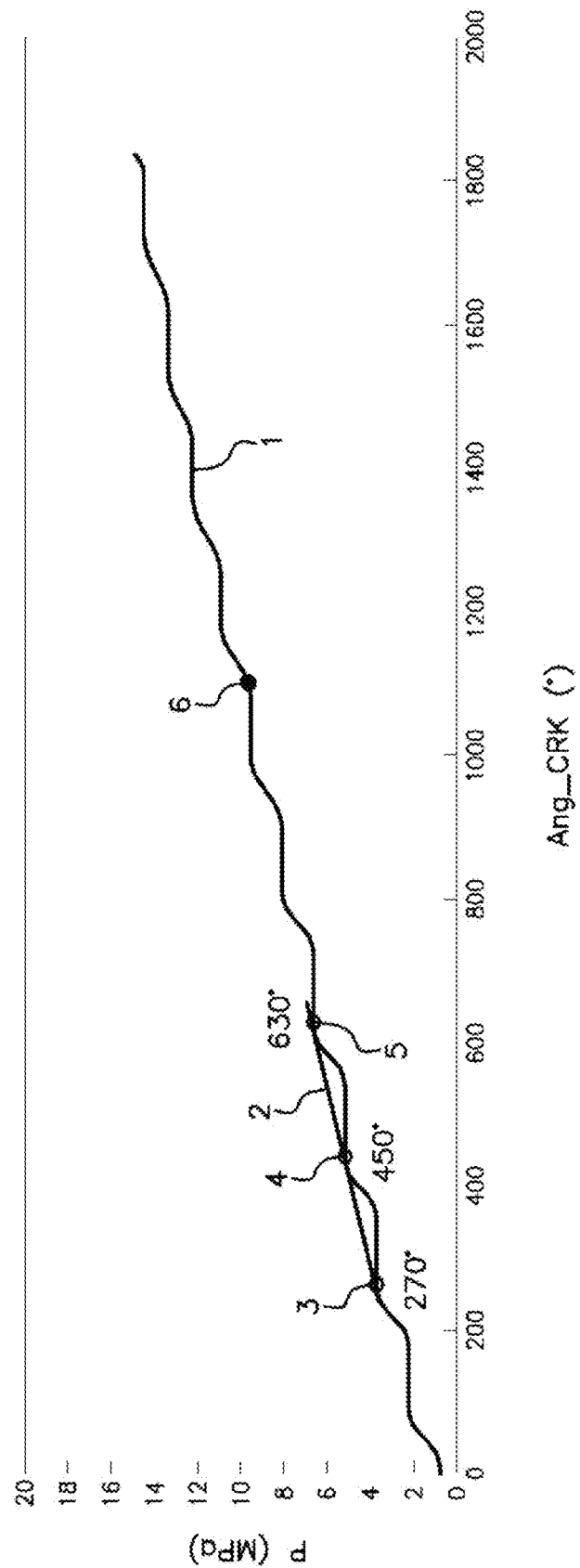
FIG. 2 represents a graph of the pressure of the fuel during the starting phase according to a second example of a method according to the invention for starting an internal combustion engine operating with a fuel of the gasoline type, at a temperature of 20 C.

For the example in FIG. 2, the same numerical references as those used for FIG. 1 have been adopted for the same elements. The example in FIG. 2 has been realized under conditions identical to those of the example in FIG. 1, with the exception of the engine temperature, which is now 20 C. Said temperature represents cold starting at an ambient temperature much higher than that of the example in FIG. 1.

In the example in FIG. 2, the following values have thus been recorded, as indicated in table II below:

| Fuel gasoline | Angular position of the crankshaft | Recorded pressure | Engine temperature |
|---|---|---|---|
| 1st TDC | 270° | 4.128 MPa | 20° C. |
| 2nd TDC | 450° | 5.736 MPa | 20° C. |
| 3rd TDC | 630° | 7.233 MPa | 20° C. |

That is to say a pressure gradient of 3.105 MPa for an angular displacement of the crankshaft of 360°. That is to say a gradient about 30% lower than that in the example in FIG. 1.

In the example represented in FIG. 2, the injection pressure is reached at the point 6 at an angular position of the crankshaft of about 1093°, for a value of 10 MPa. As shown in the figure, it is possible to use three points 3, 4, and 5 for the calculation of the pressure gradient, and to obtain an adjustment to the quantity of fuel to be injected before having arrived at the injection pressure, but before the first combustions.

Figure 3:
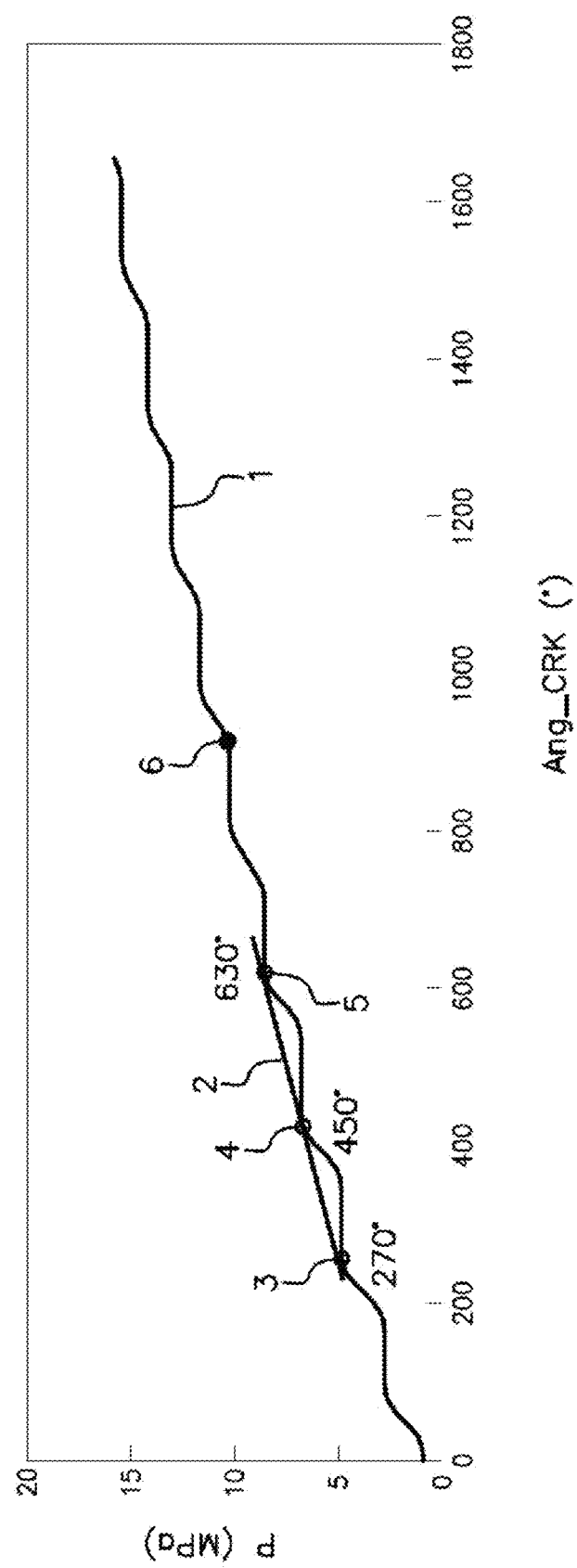
FIG. 3 represents a graph of the pressure of the fuel during the starting phase according to a second example of a method according to the invention for starting an internal combustion engine operating with a fuel of the ethanol type, at a temperature of 20 C.

For the example in FIG. 3, the same numerical references as those used for FIG. 1 have been adopted for the same elements. In the example in FIG. 3, the following values have been recorded, as indicated in table III below:

| Fuel Ethanol | Angular position of the crankshaft | Recorded pressure | Engine temperature |
|---|---|---|---|
| 1st TDC | 270° | 46.9 bars | 20° C. |
| 2nd TDC | 450° | 65.15 bars | 20° C. |
| 3rd TDC | 630° | 82.01 bars | 20° C. |

That is to say a pressure gradient of 3.511 MPa for an angular displacement of the crankshaft of 360°. That is to say a gradient about 13% higher than that in the example in FIG. 2.

In the example represented in FIG. 3, the injection pressure is reached at the point 6 at an angular position of the crankshaft of about 924°, for a value of 10 MPa. As shown in the figure, it is possible to use three points 3, 4, and 5 for the calculation of the pressure gradient, and to obtain an adjustment in the quantity of fuel to be injected before having arrived at the injection pressure, but before the first combustions.

It will be noted from the three examples above that the differences between the pressure gradients are sufficiently great to clearly distinguish the adjustments to be applied to the mass of fuel to be injected.

An example of a device for starting a direct-injection internal combustion engine, making it possible to accelerate the starting phase by adapting the quantity of fuel injected during said starting phase, before the engine reaches it steady operating speed, by an injection system containing, in a manner known per se, a high-pressure fuel injection pump, means of measuring the pressure delivered by the latter, for example by means of a fuel pressure sensor FUP positioned in a fuel accumulator rail under pressure, an engine control unit or ECU, a starter, means of authorization of the first injection given by the engine control unit, comprises in addition according to the invention in the form of computer software implemented in the engine control unit, means for the implementation of a method as described in one or a plurality of examples above, which may advantageously be appropriate depending on the usage and on the geographical location in which the vehicle is used, for example depending on the temperatures of the location and the fuels that are utilized and/or a mixture thereof.

The invention claimed is:

1. A method for starting a direct-injection internal combustion engine of a vehicle, such that a starting phase is accelerated by adapting a quantity of fuel injected during said starting phase, before the engine reaches a steady operating speed, by means of an injection system containing a high-pressure fuel injection pump, means of measuring a pressure delivered by the high-pressure fuel injection pump, and an engine control unit, wherein said method comprises the following steps:
   rotating the high-pressure injection pump by means of a starter;
   measuring the pressure of the fuel delivered by said high-pressure injection pump, taken at least at two successive compression top dead centers of the pump operating in a maximum output mode;
   establishing a pressure gradient, on an angular reference system, of the fuel delivered by said high-pressure injection pump, based on the pressure measured at said at least two successive compression top dead centers of the high-pressure injection pump characterized by their angular positions;
   comparing said established pressure gradient with at least one predefined bijective table that respectively matches a plurality of quantities of fuel to be injected and a plurality of said pressure gradients for a given temperature or a given range of temperatures of the engine, said at least one predefined bijective table being implemented in the engine control unit; and
   adapting the quantity of fuel injected during the starting phase before the engine reaches a steady operating speed, depending on a result of the comparison, in order to inject a quantity of fuel that corresponds, in the predefined bijective table, to the established pressure gradient, upon authorization of the first injection given by the engine control unit.

2. The method as claimed in claim 1, wherein:
   said at least one bijective table that respectively matches a plurality of quantities of fuel to be injected and a plurality of pressure gradients is predefined for a given range of engine temperatures,
   a plurality of said predefined bijective tables are implemented in the engine control unit, covering a plurality of ranges of engine temperatures, respectively, including at least one range of cold-starting temperatures, and
   said method in addition consisting of measuring the engine temperature before comparing said established gradient with said at least one predefined bijective table.

3. The method as claimed in claim 1, wherein the position of said at least two successive compression top dead centers of the fuel injection pump is defined by means of a sensor for the position of the engine crankshaft, by a rule linking the angular positions between the crankshaft and the high-pressure fuel injection pump, and by the engine control unit.

4. The method as claimed in claim 1, wherein the pressure gradient is established in relation to a variation in the angular position of the high-pressure injection pump, in the form $dp/d\alpha$, where:
   $dp$ is the variation in pressure between said at least two successive compression top dead centers of the pump,
   $d\alpha$ is the angular variation of the crankshaft between said at least two successive compression top dead centers of the pump.

5. The method as claimed in claim 1, wherein the pressure gradient of the fuel delivered by said high-pressure injection pump is established with three compression top dead centers of the high-pressure injection pump, or more.

6. A device for starting a direct-injection internal combustion engine, such that a starting phase is accelerated by adapting a quantity of fuel injected during said starting phase before the engine reaches a steady operating speed, by an injection system containing a high-pressure fuel injection pump, means of measuring the pressure delivered by the fuel injection pump, an engine control unit, a starter, means of authorization of the first injection given by the engine control unit, comprising means for the implementation of a method as claimed in claim 1.

7. The method as claimed in claim 2, wherein the position of said at least two successive compression top dead centers of the fuel injection pump is defined by means of a sensor for the position of the engine crankshaft, by a rule linking the angular positions between the crankshaft and the high-pressure fuel injection pump, and by the engine control unit.

8. The method as claimed in claim 2, wherein the pressure gradient is established in relation to a variation in the angular position of the high-pressure injection pump, in the form $dp/d\alpha$, where:
   $dp$ is the variation in pressure between said at least two successive compression top dead centers of the pump,
   $d\alpha$ is the angular variation of the crankshaft between said at least two successive compression top dead centers of the pump.

9. The method as claimed in claim 3, wherein the pressure gradient is established in relation to a variation in the angular position of the high-pressure injection pump, in the form $dp/d\alpha$, where:
   $dp$ is the variation in pressure between said at least two successive compression top dead centers of the pump,
   $d\alpha$ is the angular variation of the crankshaft between said at least two successive compression top dead centers of the pump.

10. The method as claimed in claim 2, wherein the pressure gradient of the fuel delivered by said high-pressure injection pump is established with three compression top dead centers of the high-pressure injection pump, or more.

11. The method as claimed in claim 3, wherein the pressure gradient of the fuel delivered by said high-pressure injection pump is established with three compression top dead centers of the high-pressure injection pump, or more.

12. The method as claimed in claim 4, wherein the pressure gradient of the fuel delivered by said high-pressure injection pump is established with three compression top dead centers of the high-pressure injection pump, or more.

13. A device for starting a direct-injection internal combustion engine, such that a starting phase is accelerated by adapting a quantity of fuel injected during said starting phase before the engine reaches a steady operating speed, by an injection system containing a high-pressure fuel injection pump, means of measuring the pressure delivered by the fuel injection pump, an engine control unit, a starter, means of authorization of the first injection given by the engine control unit, comprising means for the implementation of a method as claimed in claim 2.

14. A device for starting a direct-injection internal combustion engine, such that a starting phase is accelerated by adapting a quantity of fuel injected during said starting phase before the engine reaches a steady operating speed, by an injection system containing a high-pressure fuel injection pump, means of measuring the pressure delivered by the fuel injection pump, an engine control unit, a starter, means of authorization of the first injection given by the engine control unit, comprising means for the implementation of a method as claimed in claim 3.

15. A device for starting a direct-injection internal combustion engine, such that a starting phase is accelerated by adapting a quantity of fuel injected during said starting phase before the engine reaches a steady operating speed, by an injection system containing a high-pressure fuel injection pump, means of measuring the pressure delivered by the fuel injection pump, an engine control unit, a starter, means of authorization of the first injection given by the engine control unit, comprising means for the implementation of a method as claimed in claim 4.

16. A device for starting a direct-injection internal combustion engine, such that a starting phase is accelerated by adapting a quantity of fuel injected during said starting phase before the engine reaches a steady operating speed, by an injection system containing a high-pressure fuel injection pump, means of measuring the pressure delivered by the fuel injection pump, an engine control unit, a starter, means of authorization of the first injection given by the engine control unit, comprising means for the implementation of a method as claimed in claim 5.

17. The method as claimed in claim 7, wherein the pressure gradient is established in relation to a variation in the angular position of the high-pressure injection pump, in the form $dp/d\alpha$, where:
- $dp$ is the variation in pressure between said at least two successive compression top dead centers of the pump,
- $d\alpha$ is the angular variation of the crankshaft between said at least two successive compression top dead centers of the pump.

18. The method as claimed in claim 7, wherein the pressure gradient of the fuel delivered by said high-pressure injection pump is established with three compression top dead centers of the high-pressure injection pump, or more.

19. The method as claimed in claim 8, wherein the pressure gradient of the fuel delivered by said high-pressure injection pump is established with three compression top dead centers of the high-pressure injection pump, or more.

20. The method as claimed in claim 9, wherein the pressure gradient of the fuel delivered by said high-pressure injection pump is established with three compression top dead centers of the high-pressure injection pump, or more.

* * * * *